Patented Apr. 11, 1939

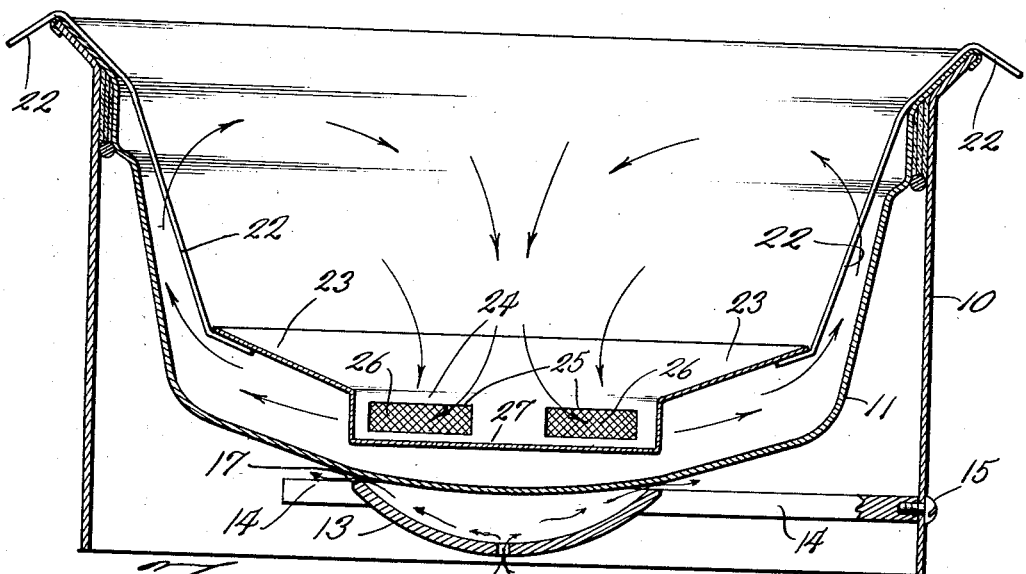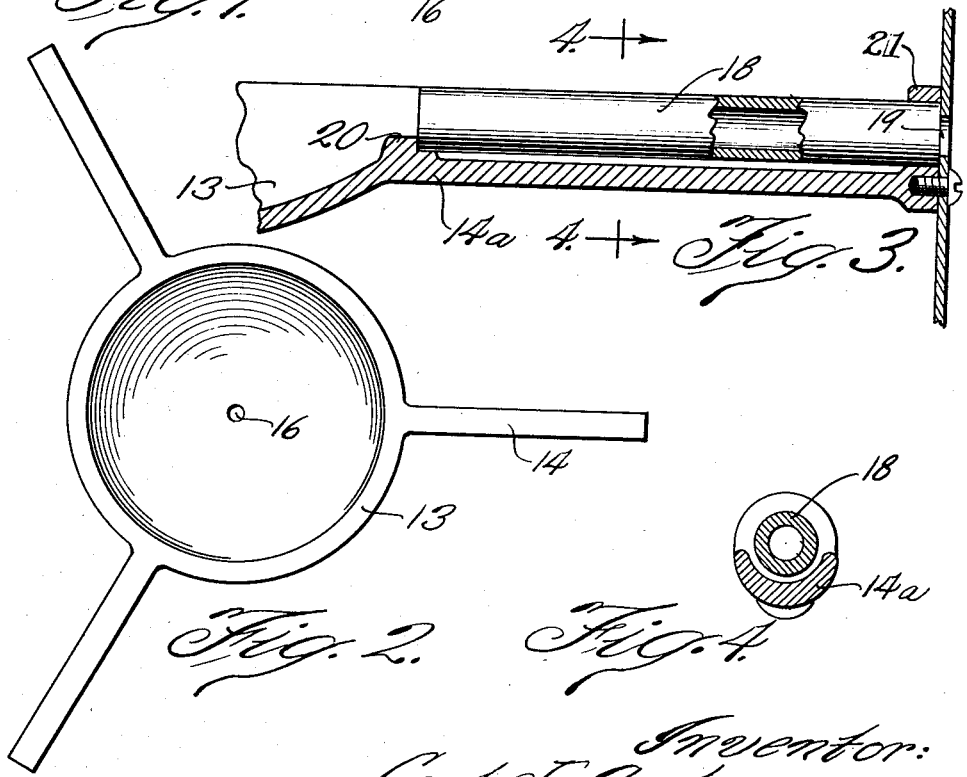

2,154,391

UNITED STATES PATENT OFFICE 2,154,391

COOKING APPARATUS

Carl J. Anderson, Chicago, Ill., assignor to Joseph B. Zimmer, Chicago, Ill.

Application August 25, 1936, Serial No. 97,806

5 Claims. (Cl. 53—7)

My invention relates to cooking devices of the type commonly called "deep fat friers", and is directed to improvements in the construction and operation of such devices.

One object of my invention is to provide an improved way of obtaining a cold spot or portion in the fat-holding kettle when the fire over which it is placed does not provide such cold spot.

A second object is to provide improved means for catching the debris which falls from the food being cooked. The cold spot forms part of a means for producing a desired kind of circulation of fat within the kettle, and to avoid the charring of food particles which fall to the bottom of the kettle.

In the accompanying drawing:

Fig. 1 is a vertical section of the apparatus;

Fig. 2 is a plan of the cup which furnishes a cold air chamber beneath the center of the kettle;

Fig. 3 represents, at an enlarged scale, an alternative method of admitting outside air to the cold air chamber; and Fig. 4 is a section on line 4—4 of Fig. 3.

In a circular frame, shell or housing 10 is supported a kettle 11 for containing the fat to be used in cooking. A shallow cup 13, having arms 14, is supported from the housing 10 by screws 15, located below the center of the kettle 11. In the bottom of the cup is a small opening 16, which may be about one-quarter of an inch in diameter. A space 17 of about one-eighth of an inch is left between the rim of the cup and the bottom of the kettle. As so constructed, the cup, and that part of the lower face of the kettle which is above the cup, provide an air chamber having an inlet 16 and an outlet 17.

The kettle is intended for use on an ordinary gas stove. The burner of such a stove usually has no flame at the center of the burner, and it is intended that the kettle shall be placed centrally over the burner so that the opening 16 will come at the point where there is no fire. As a consequence, when cooking operations are going on, the fire causes a draft of fresh and relatively cold air to flow upward through hole 16 and out through the space 17, as is shown by the short arrows. This produces a cold spot at the center of the bottom of the kettle, which cold spot affects the circulation of the hot fat within the kettle.

If the kettle is to be placed over a coal fire, or any burner which does not have central vacant space through which fresh air may pass to the hole 16, then that hole is closed and one of the arms of the cup 13 is made as shown at 14a in Figs. 3 and 4. In this case, the arm is made concave above, and, supported at its ends, is a small pipe 18 which furnishes a cold air passageway from the exterior of the housing 11 to the interior of the cup 13. Part of this passageway is an opening 19 in the housing, which opening may conveniently be of the diameter of the interior of the pipe so that the metal around the opening 19 may serve to prevent a lateral displacement of the pipe to the right, as shown in Fig. 3. A small lug 20 in the cup will serve to prevent lateral displacement in the opposite direction. An apertured lug 21 at the outer end of arm 14a, and the bottom of the kettle at the inner end will serve to prevent accidental displacement of pipe 18 during shipment.

With the cup 13 receiving unheated air, either through the opening 16 or by way of the pipe 18, the part of the kettle over the cup becomes an air cooled spot. The effect of applying heat to a kettle having such a cold spot is to cause liquid in the kettle to flow annularly upward and centrally downward. Food to be cooked is carried in a wire basket supported in the upper part of the liquid in the kettle. As such basket is well known, it is not illustrated in the drawing.

A debris-catching trap is connected to and supported centrally in the kettle by a pair of arms 22 which have their upper ends resting on the upper edge of the kettle and furnish a convenient means for removing the trap and emptying it at any time when cooking operations are not going on. This trap consists of a dish or tray 23 which has a cylindrical recess 24 at its center, the diameter of the recess being approximately the same as that of the cup 13, directly below it. The vertical walls of this recess are provided with openings 25 which are covered by screens 26.

When a kettle of fat is placed over a heater, the fat circulates as indicated by the arrows inside of the kettle; that is, annularly upward and centrally downward. In this movement, the hot fat flows over the food held in a basket, as previously stated.

This device is intended to be capable of remaining in continuous operation for many hours at a time, and during that time many different kinds of foods would be cooked in the same fat. Much of this food is covered with cracker crumbs, batter or other coating, before being placed in the fat. The hot fat browns this coating, and the movement of the fat breaks off small particles, which are more or less charred. If allowed to remain in the fat, these particles become broken up into smaller and smaller pieces, and will soon make the fat unfit for use.

The purpose of the debris trap is to catch these particles, particularly the smaller ones, so that they may be removed before they contaminate the fat. The tray 23 is large enough in diameter to deflect all broken particles into the recess 24. The larger particles are stopped directly by the screens 26. Of the particles too small to be stopped by the screens, a large proportion settle on the floor 27 of the recess 24. The others make one or more circuits with the fat, but substantially all are trapped within a short time after they become detached from the food. It is to be noticed that the fat in the recess 24 below the lower edges of openings 25 is a quiescent liquid, and that all particles entering this quiescent liquid will remain undisturbed until the trap is removed for emptying it.

If the fire under the kettle should be left burning between cooking operations, and while the trap is removed for emptying purposes, then some of the extremely minute debris left floating in the fat will be deposited in the center of the kettle over the center of the air cooled spot. As the fat at this place will be quiescent when the trap is returned to place, this construction furnishes a secondary trap which will be cleaned out only when the fat is emptied from the kettle. However, debris at this place will not be harmful, as it is neither heated nor circulated. If there is little or no debris falling from the food being cooked, then cooking may be carried on for some time without the use of the primary trap. The secondary trap will take care of all the debris which may accumulate.

What I claim is:

1. A kettle, means for supporting it for cooking purposes over and out of contact with a heater, an air chamber having one of its walls consisting of a central portion of the bottom of the kettle and its other surface supported between the kettle and the heater and free from contact with either, and means operated by the heater for causing relatively cold air to flow through the air chamber.

2. A housing adapted to stand upon a stove or other heater, a kettle supported within said housing, an air chamber supported by the housing and located between the bottom of the kettle and the top of the heater upon which the housing stands, and means operated by the heater for causing relatively cold air to flow through said air chamber.

3. A housing adapted to stand on a heater, a kettle supported in said housing, an air chamber carried by the housing and located below the center of the kettle, there being an annular air outlet between the kettle and the upper edge of the air chamber, and means fo conveying relatively cold air to the interior of the air chamber.

4. A housing adapted to rest on a heater, a kettle supported in said housing, an air chamber carried by the housing and having an air outlet in contact with the bottom of the kettle, and an air inlet passageway from the exterior of the housing to the interior of the air chamber.

5. A frame adapted to stand on a stove and to support a kettle, and removable means carried by the frame and serving to provide an air cooled portion between the stove and the center of the kettle during cooking operations.

CARL J. ANDERSON.